(12) United States Patent
Vermeulen et al.

(10) Patent No.: US 7,365,473 B2
(45) Date of Patent: Apr. 29, 2008

(54) METHOD FOR DISPLACING A MOVABLE ELEMENT BY MEANS OF A LEAST TWO ACTUATORS FACING EACH OTHER AND POSITIONED ON A STATOR, AS WELL AS A WAVE MOTOR, DISPLACING DEVICE AND ASSEMBLY

(75) Inventors: Marcus Martinus Petrus Adrianus Vermeulen, Eindhoven (NL); Felix Godfried Peter Peeters, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 309 days.

(21) Appl. No.: 10/507,680

(22) PCT Filed: Mar. 14, 2003

(86) PCT No.: PCT/IB03/00984

§ 371 (c)(1),
(2), (4) Date: Sep. 14, 2004

(87) PCT Pub. No.: WO03/079459

PCT Pub. Date: Sep. 25, 2003

(65) Prior Publication Data

US 2005/0140245 A1 Jun. 30, 2005

(30) Foreign Application Priority Data

Mar. 15, 2002 (EP) .................................. 02076014

(51) Int. Cl.
*H02N 2/00* (2006.01)
*H01L 41/047* (2006.01)
*H03H 9/145* (2006.01)

(52) U.S. Cl. ............................ 310/313 R; 310/323.02; 310/323.03

(58) Field of Classification Search ............ 310/313 R, 310/323.02, 323.03
See application file for complete search history.

(56) References Cited

U.S. PATENT DOCUMENTS

| | | | | |
|---|---|---|---|---|
| 5,006,749 A | * | 4/1991 | White | 310/323.03 |
| 6,285,113 B1 | * | 9/2001 | Asai et al. | 310/313 R |
| 6,331,747 B2 | * | 12/2001 | Yoshida et al. | 310/313 R |
| 6,949,868 B2 | * | 9/2005 | Iseki | 310/323.02 |

FOREIGN PATENT DOCUMENTS

| | | | |
|---|---|---|---|
| EP | 0533025 A1 | * | 3/1993 |
| JP | 2001054290 A | * | 2/2001 |
| JP | 2001197761 A | * | 7/2001 |

* cited by examiner

*Primary Examiner*—J. San Martin

(57) ABSTRACT

A method for displacing a movable element (3) by means of at least two actuators (4, 5) facing each other on a stator (2). Electrical wave signals are simultaneously applied to at least two actuators facing each other so that oppositely directed waves are generated in the surface of the stator. The two oppositely directed waves form a compound wave in the surface of the stator by means of which the movable element is displaced over a moving area located between the actuators.

20 Claims, 2 Drawing Sheets

Figure 1:
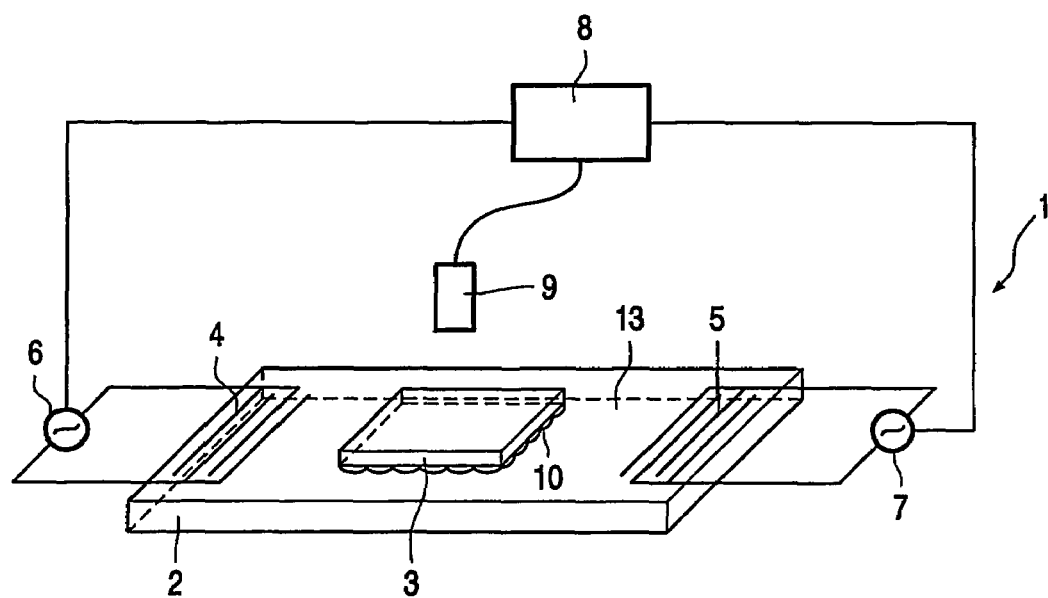

METHOD FOR DISPLACING A MOVABLE ELEMENT BY MEANS OF A LEAST TWO ACTUATORS FACING EACH OTHER AND POSITIONED ON A STATOR, AS WELL AS A WAVE MOTOR, DISPLACING DEVICE AND ASSEMBLY

The invention relates to a method for displacing a movable element by means of at least two actuators facing each other on a stator, an electrical wave signal being applied to at least one actuator so that a wave moving in the stator surface is generated by means of which the movable element is displaced.

The invention further relates to a wave motor comprising a movable element as well as a displacing device comprising at least two actuators facing each other on a stator, which actuators are connected to at least one generator.

The invention also relates to a displacing device to be applied to such a wave motor as well as an assembly comprising at least a wave motor of this type.

In a method known from U.S. Pat. No. 6,331,747 B2 electrical wave signals are generated by two generators, which signals are applied to two adjacent actuators. Waves moving in the same direction in the surface of the stator are generated by the actuators by means of which waves the movable element is displaced.

The waves generated in the surface, also known as surface-acoustic waves, cause vibrations of separate particles of the stator surface to occur. Each particle is subjected to a longitudinal wave movement moving in parallel with the surface, and a transversal wave movement moving transversely to the surface and having a 90° phase difference. This results in elliptical movements of the individual particles of the stator surface. The movable element is displaced due to the tops of the electrical movements of the particles, the direction of movement of the movable element being opposite to the direction of movement of the surface acoustic waves.

The speed at which the movable element is displaced is proportional to the amplitude of the longitudinal wave movement which in its turn is proportional to the voltage of the electrical wave signal applied to the actuator. The amplitude of the transversal wave movement has a fixed ratio to the amplitude of the longitudinal wave movement. If the voltage applied to an actuator is reduced to obtain a lower amplitude of the longitudinal wave movement and a corresponding lower speed of displacement of the movable element, also the amplitude of the transversal wave movement will be reduced. However, to be able to displace the movable element, the amplitude in transversal direction should be at least equal to the surface coarseness of the stator surface and the elastic impression of the movable element in the stator. Therefore, the lowest possible constant speed is determined by the stator surface coarseness to be produced and the elastic impression of the movable element in the stator.

To eliminate this problem it is possible to displace the movable element intermittently at a relatively large speed, so that a relatively low average speed is realized. This speed, however, is not constant.

In addition, the length of the intermittent wave sequence is to be at least equal to the length of the movable element.

The known method further has the disadvantage that the minimum displacement to be realized of the movable element also depends on the stator surface coarseness to be realized and the elastic impression of the movable element in the stator, since this also determines the minimum amplitude required of the transversal wave movement and, therefore, also the minimum amplitude of the longitudinal movement.

It is an object of the invention to provide a method in which the movable element can be displaced accurately at a relatively low speed and/or over a relatively short distance.

This object is achieved in the method according to the invention in that electrical wave signals are simultaneously applied to at least two actuators facing each other, so that oppositely directed waves are generated in the surface of the stator, the two oppositely directed waves forming a compound wave in the surface of the stator by means of which the movable element is displaced over a moving area located between the actuators.

The frequencies of the simultaneously applied electrical wave signals may be different.

The simultaneously generated oppositely directed waves move the particles in the surface while the longitudinal wave movements caused by the oppositely directed waves substantially cancel each other out, whereas the transversal wave movements amplify each other. As a result, the movable element can be displaced at a relatively low speed over a relatively short distance while there is no hindrance from the surface coarseness of the stator and the elastic impression of the movable element in the stator.

Since the transversal amplitude of the compound elliptical movement of each particle exceeds the amplitude of the transversal wave movement caused by the waves separately moving in the surface, it is possible to reduce the amplitude of these separate waves until the amplitude of the compound transversal wave movement of each particle is substantially equal to the surface coarseness of the stator and the elastic impression of the movable element in the stator. This makes it possible to accurately move the movable element over a relatively short distance with relatively little energy.

If the electrical wave signals are applied over a longer period of time, this will result in a displacement of the movable element at relatively low speed.

An embodiment of the method according to the invention is characterized in that the amplitudes of the electrical wave signals are different.

The amplitude of the compound waves in the surface and therefore the amplitude of the longitudinal wave movement of each particle will then be proportional to the difference between the amplitudes of the electrical wave signals. By regulating the amplitudes of the different electrical wave signals, the amplitude of the compound wave can therefore be determined.

A further embodiment of the method according to the invention is characterized in that the amplitude of at least one electrical wave signal is varied.

By varying the amplitude of at least one electrical wave signal, the amplitude of the compound wave can be varied depending on the desired displacement and/or speed of the movable element.

Yet another embodiment of the method according to the invention is characterized in that the phases of the electrical wave signals are different.

Due to the different phases of the electrical wave signals a compound wave is formed in the stator surface which wave has a form depending on the phase difference, so that a desired wave movement of the separate particles can be realized.

Again another embodiment of the method according to the invention is characterized in that the phase of at least one electrical wave signal is varied.

Varying the phase may provide that any desired movement and/or speed of the movable element can be realized.

Another embodiment of the method according to the invention is characterized in that at least one of the electrical wave signals is driven intermittently.

In that case the displacement of the movable element will be a fraction of the displacement when the electrical wave signals are driven continuously.

Yet another embodiment of the method according to the invention is characterized in that the frequencies of the intermittent drives of the two electrical wave signals are different.

The different frequencies of the intermittent drives of the two electrical wave signals provide that a compound intermittent wave is formed in the surface of the stator, so that a desired wave movement of the separate particles can be produced.

A further embodiment of the method according to the invention is characterized in that the frequency of the intermittent drive of at least one electrical wave signal is varied.

Any displacement and/or speed of the movable element can be produced by varying the frequency.

Yet another embodiment of the method according to the invention is characterized in that the pulse durations of the intermittent drives of the two electrical wave signals are different.

As a result of the different pulse durations of the intermittent drives of the two electrical wave signals a compound intermittent wave is formed in the surface of the stator, so that a desired wave movement of the separate particles may be produced.

A still further embodiment of the method according to the invention is characterized in that the pulse duration of the intermittent drive of at least one electrical wave signal is varied.

By varying the frequency, any desired displacement and/or speed of the movable element may be produced.

Another embodiment of the method according to the invention is characterized in that at least two pairs of mutually facing actuators, the pairs mutually enclosing a 90° angle, generate two compound waves by means of which the movable element is displaced in two mutually transverse directions parallel with the surface of the stator.

As a result it is possible to accurately displace the movable element in two mutually transverse directions at relatively low speed and/or over a relatively short distance.

Yet again another embodiment of the method according to the invention is characterized in that a measuring system determines the position of the movable element, subsequently the measured position is compared with a desired position by means of a processor after which, based on a difference between the measured position and the desired position, at least one electrical wave signal is applied to an actuator by the processor.

In this fashion the movable element is accurately regulated to a desired position while the measuring system verifies whether the desired position has actually been reached. In case of deviations, the desired actuator/actuators may be activated by means of the processor for an additional displacement of the movable element.

The invention also intends to provide a wave motor with which the movable element can be accurately displaced at relatively low speed and/or over a relatively short distance.

This object is achieved by the wave motor according to the invention in that the actuators facing each other on the stator can be activated simultaneously while a moving area over which the movable element can be displaced is located between the actuators that can be activated simultaneously.

As a result of the actuators that can be activated simultaneously it is possible to generate a compound wave in the surface of the moving area, which compound wave causes local surface-wave movements to occur having a relatively small longitudinal amplitude and a relatively large transversal amplitude, so that the movable element can be displaced at a relatively low speed or can be subjected to a relatively small displacement.

A further embodiment of the wave motor according to the invention is characterized in that the wave motor further comprises a processor connected to the generator as well as a measuring system connected to the processor.

By means of the measuring system it is possible to give feedback about the actual position and the desired position of the movable element via the processor, so that an accurate positioning of the movable element is possible.

A further embodiment of the wave motor according to the invention is characterized in that at least two actuators facing each other are located on the stator, the pairs mutually enclosing a 90° angle.

The movable element can be accurately displaced over the entire surface of the stator by means of such a surface-wave motor.

The invention further relates to a displacing device suitable for application in a wave motor of this type, by means of which a movable element located on the stator can be displaced accurately.

The invention further relates to an assembly comprising at least two wave motors whose movable elements are rigidly connected to each other.

It is possible to drive the wave motors by means of such an assembly, so that the movable elements are driven by slightly different surface-acoustic waves. The effect will be that the rigidly connected elements are moved at a speed that differs from the two speeds that may be expected because of the surface-acoustic waves. The so-called stick-slip phenomenon with which relatively large strongly varying friction coefficients are to be combated at relatively low speeds does not form any hindrance.

At relatively small speeds the wave motors could then drive the movable elements in the opposite direction.

These and other aspects of the invention are apparent from and will be elucidated with reference to the embodiments described hereinafter.

Figure 2:
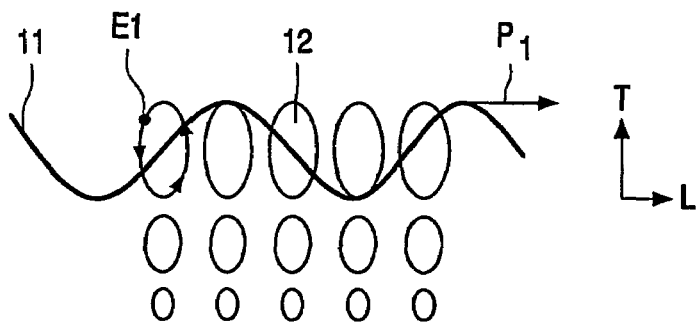
Figure 3:
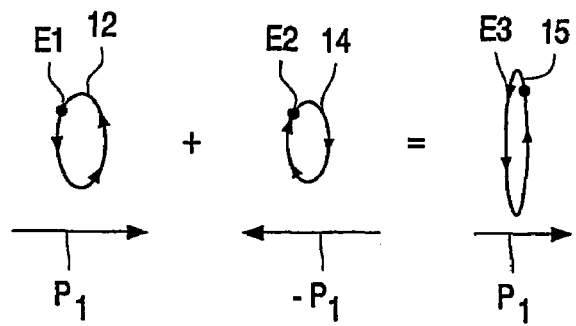
Figure 4:
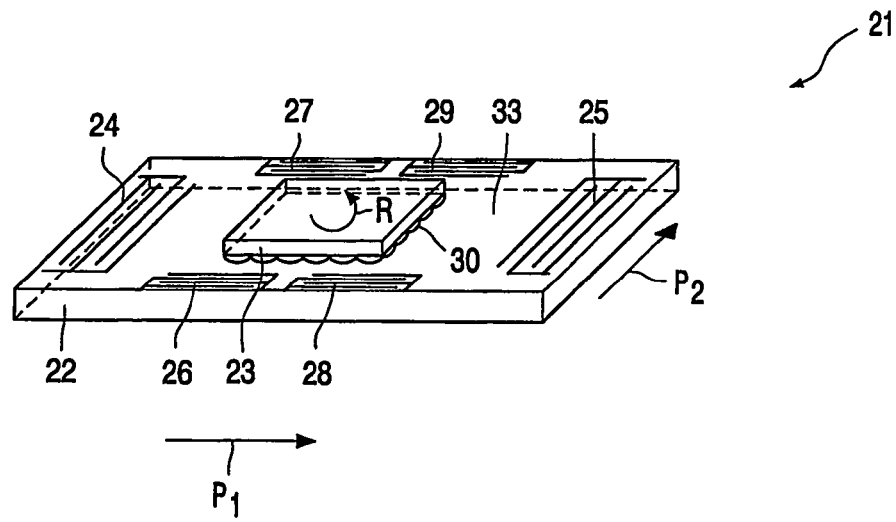
Figure 5:
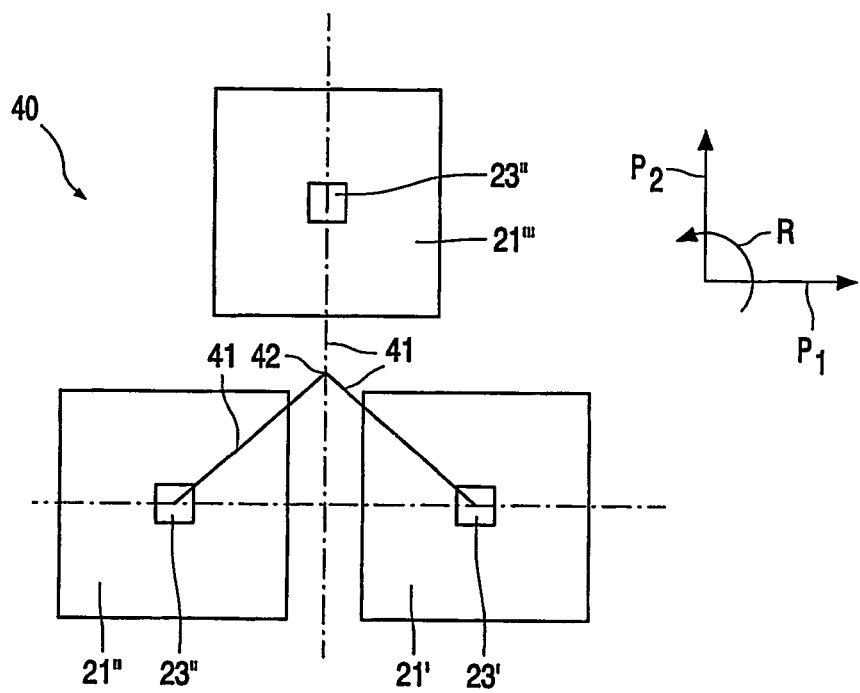

In the drawings:

FIG. 1 shows a perspective view of a first embodiment of a wave motor according to the invention, FIG. 2 shows a diagrammatic cross-section of a stator with a wave moving through it, FIG. 3 shows two individual elliptical movements of particles in the stator as well as a consequent compound elliptical movement, FIG. 4 shows a perspective view of a second embodiment of a wave motor according to the invention, and FIG. 5 shows a plan view of an assembly according to the invention.

In the drawing Figures like elements bear like reference symbols.

FIG. 1 shows a wave motor 1 which comprises a stator 2 extending horizontally and a movable element 3 located on the stator 2. The upper surface of the stator 2 comprises a thin layer of, for example, piezoelectric material with two actuators 4, 5 being installed on both sides of the upper surface of the stator 2. The actuator 4, 5 is, for example, a so-called interdigital transducer (IDT). Each actuator 4, 5 is electrically connected to a generator 6, 7 which is driven by a processor 8. Furthermore, a measuring system 9 by means of which the position of the movable element 3 relative to the stator 2 can be determined is also connected to the processor 8.

The movable element 3 has contact blocks 10 on a side facing the stator 2 by means of which blocks the movable element 3 rests on the surface of the stator 2. Due to the spherical contact surfaces 10 the surface on which the movable element 3 contacts the stator 2 is relatively limited.

The actuators 4, 5 are positioned on both sides of the stator 2, while a moving area 13 over which the actuator 3 can be moved is visible between the actuators 4, 5.

Electrical wave signals $V_1=V_{01} \sin(Tt+n_1)$ and $V_2=V_{02} \sin(Tt+n_2)$ can be applied to the actuators 4, 5 by the generators 6, 7, respectively. These electrical wave signals applied to the actuators 4, 5 cause surface-acoustic waves to occur in the surface of the stator 2.

FIG. 2 shows such a surface-acoustic wave 11 which comes from the actuator 4. The wave 11 propagates through the surface of the stator 2 in the direction shown by arrow P1 while the separate particles of the surface are caused to vibrate. FIG. 2 shows the movements of the separate particles by means of ellipses 12.

Due to the surface-acoustic wave 11 a particle undergoes a longitudinal wave movement in and opposite to the direction indicated by L and at the same time a transversal wave movement in and opposite to the direction shown by arrow T. This transversal wave movement has a 90° phase difference relative to the longitudinal wave movement which results in an elliptical movement in the direction shown by the arrow E1. As may be seen in FIG. 2, the particle near the top of the ellipse 12 is displaced in a direction opposite to the arrow P1. The spherical contact surfaces 10 of the movable element 3 rest on the tops of the particles, push them in partially and are displaced as a consequence of the moving of the particles, so that the movable element is displaced in the direction of the actuator 4 also in the direction opposite to the direction indicated by the arrow P1.

According to the invented method electrical signals are simultaneously applied to the actuators 4, 5 of the wave motor 1, which signals cause each a surface-acoustic wave to appear in the surface of the stator 2.

FIG. 3 shows the elliptic movement of a single particle caused by the separate waves. The surface-acoustic wave coming from the actuator 4 causes an elliptical movement 12 of a particle in the surface to occur, so that the particle is moved in a direction indicated by the arrow E1. The surface-acoustic wave generated by the actuator 5 facing the actuator 4 causes an elliptical movement 14 to be imposed on the same particle, causing the particle to move in the direction indicated by the arrow E2.

If the amplitudes of the two surface-acoustic waves are equal, the movable element stands still.

Now if, as with the example shown in FIG. 3, the amplitude of the surface-acoustic wave coming from the actuator 4 exceeds the amplitude of the surface-acoustic wave coming from the actuator 5, the transversal and longitudinal wave movement of the elliptical movement 12 will exceed that of the elliptical movement 14. Since the respective particle simultaneously undergoes the two elliptical wave movements, this will result in an elliptical movement 15 in the direction indicated by the arrow E3. The amplitude of the longitudinal wave movement will then be equal to the difference of the amplitudes of longitudinal wave movements of the ellipses 12 and 14 while the amplitude of the transversal wave movement will be equal to the sum of the amplitudes of the transversal wave movements of the ellipses 12 and 14. As is apparent from FIG. 3, the resulting amplitude of the longitudinal wave movement is relatively small, whereas the amplitude of the transversal wave movement is relatively large. This means that with a longitudinal wave movement of this kind a relatively small displacement of the movable element 3 will be executed in the direction opposite to arrow P1. At the same time, as a result of the relatively large amplitude of the transversal wave movement, any surface coarseness of the stator 2 will not cause much hindrance.

If the movable element 3 is to be displaced in the direction of the actuator 5, the amplitude of the electrical wave signal applied to the actuator 5 will exceed the amplitude of the electrical wave signal applied to the actuator 4.

FIG. 4 shows a second embodiment of a wave motor 21 according to the invention which, in addition to a first pair of actuators 24, 25 facing each other, has two pairs of actuators 26, 27 and 28, 29 respectively, which are positioned on a stator 22. The stator 22 with the actuators 24-29 disposed thereon forms a displacing device for a movable element 23 positioned thereon that rests with spherical contact surfaces 30 on the stator surface 22. The movable element 23 can be displaced over a moving area 33 situated between the actuators 24-30.

In a comparable manner to the manner indicated in FIG. 1, the actuators are connected to generators for supplying electrical wave signals to the actuators. The generators are connected to a processor for driving the generators in the desired fashion. Furthermore, a measuring system is connected to the processor.

The pairs of actuators 26, 27 and 28, 29, respectively, extend transversely on the pair of actuators 24, 25. As a result of the driving of the actuators 24, 25, the movable element 23 can be displaced in and in the opposite direction indicated by the arrow P1, whereas the movable element 23 can be moved in and in the opposite direction indicated by the arrow P2 when the actuators 26, 29 are driven.

When the driving is effected in or opposite to the direction indicated by the arrow P2, electrical wave signals are simultaneously applied to the pairs 26, 27 and 28, 29, respectively when the driving is executed in or opposite to the direction indicated by the arrow P2, which wave signals at the same time create surface-acoustic waves in the surface of the stator 22 in a way as described with reference to FIG. 3. These waves cause a compound wave to develop by means of which the movable element 23 is moved in or opposite to the direction indicated by the arrow P2.

By applying electrical signals to the actuators 26, 27 for a compound wave in the direction indicated by the arrow P2 and applying electrical signals to the actuators 28, 29 for a compound wave in the opposite direction to the arrow P2, compound waves are generated in the surface of the stator 22 which waves result in a rotation of the movable element 23 in the direction indicated by the arrow R.

In this way it is possible to obtain any desired position and orientation of the movable element in the moving area 33 on the stator 22 by means of the processor 8. The actual position of the movable element 23 may then be compared with the desired position by means of the measuring system 9 which is coupled to the processor 8 and possible corrections may be made for the driving of the actuators.

FIG. 5 shows a plan view of an assembly 40 according to the invention which comprises three wave motors 21', 21'', 21''' which accommodate three movable elements 23', 23'', 23''', respectively. The movable elements 23', 23'', 23''' are rigidly interconnected by three rods 41. The rods 41 each have the same length and enclose equal angles. However, these angles may also be different.

For clarity, the actuators, generators, processor and measuring system are not shown in FIG. 5.

For accurately displacing, for example the connection point 42 of the rods 41 in the direction indicated by the arrow P1, compound waves are generated in the wave motor 21', 21", 21'" by means of which the connection point 42 can be displaced in the directions indicated by the arrows P1, P2, R. When the displacement is effected at relatively low speed, different compound waves are generated by the wave motors so that the connection point 42 is moved by a combination of these compound waves. The speed of the connection point 42 then differs from the speeds of the separate compound waves. As a result, the risk of so-called stick-slip phenomena is avoided where relatively strongly varying friction coefficients are to be combated before there is a displacement of the movable element. The waves already present in the surface cause such a stick-slip phenomenon not to occur.

Alternatively it is possible to provide the stator with three pairs of actuators which form 60° angles to each other or another number of pairs which form another desired angle to each other.

It is also possible to provide the assembly 40 shown in FIG. 5 with only two instead of three wave motors.

Another possibility is to make the whole stator from piezoelectric material.

The invention claimed is:

1. A method for displacing a movable element by means of at least two actuators facing each other on a stator, an electrical wave signal being applied to at least one actuator so that a wave moving in the stator surface is generated by means of which the movable element is displaced, characterized in that electrical wave signals are simultaneously applied to at least two actuators facing each other, so that oppositely directed waves are generated in the surface of the stator, the two oppositely directed waves forming a compound wave in the surface of the stator by means of which the movable element is displaced over a moving area located between the actuators.

2. A method for displacing a movable element by means of at least two actuators facing each other on a stator, an electrical wave signal being applied to at least one actuator so that a wave moving in the stator surface is generated by means of which the movable element is displaced, characterized in that electrical wave signals are simultaneously applied to at least two actuators facing each other, so that oppositely directed waves are generated in the surface of the stator. the two oppositely directed waves forming a compound wave in the surface of the stator by means of which the movable element is displaced over a moving area located between the actuators, characterized in that the amplitudes of the electrical wave signals are different.

3. A method as claimed in claim 2, characterized in that the amplitude of at least one electrical wave signal is varied.

4. A method for displacing a movable element by means of at least two actuators facing each other on a stator, an electrical wave signal being applied to at least one actuator so that a wave moving in the stator surface is generated by means of which the movable element is displaced, characterized in that electrical wave signals are simultaneously applied to at least two actuators facing each other, so that oppositely directed waves are generated in the surface of the stator, the two oppositely directed waves forming a compound wave in the surface of the stator by means of which the movable element is displaced over a moving area located between the actuators, characterized in that the phases of the electrical wave signals are different.

5. A method as claimed in claim 4, characterized in that the phase of at least one electrical wave signal is varied.

6. A method for displacing a movable element by means of at least two actuators facing each other on a stator, an electrical wave signal being applied to at least one actuator so that a wave moving in the stator surface is generated by means of which the movable element is displaced, characterized in that electrical wave signals are simultaneously applied to at least two actuators facing each other, so that oppositely directed waves are generated in the surface of the stator, the two oppositely directed waves forming a compound wave in the surface of the stator by means of which the movable element is displaced over a moving area located between the actuators, characterized in that at least one of the electrical wave signals is driven intermittently.

7. A method as claimed in claim 6, characterized in that the frequencies of the intermittent drives of the two electrical wave signals are different.

8. A method as claimed in claim 7, characterized in that the frequency of the intermittent drive of at least one electrical wave signal is varied.

9. A method for displacing a movable element by means of at least two actuators facing each other on a stator, an electrical wave signal being applied to at least one actuator so that a wave moving in the stator surface is generated by means of which the movable element is displaced, characterized in that electrical wave signals are simultaneously applied to at least two actuators facing each other, so that oppositely directed waves are generated in the surface of the stator, the two oppositely directed waves forming a compound wave in the surface of the stator by means of which the movable element is displaced over a moving area located between the actuators, characterized in that the pulse durations of the intermittent drives of the two electrical wave signals are different.

10. A method as claimed in claim 9, characterized in that the pulse duration of the intermittent drive of at least one electrical wave signal is varied.

11. A method as claimed in claim 1, characterized in that at least two pairs of mutually facing actuators, the pairs mutually enclosing a 90' angle, generate two compound waves by means of which the movable element is displaced in two mutually transverse directions parallel with the surface of the stator.

12. A method for displacing a movable element by means of at least two actuators facing each other on a stator, an electrical wave signal being applied to at least one actuator so that a wave moving in the stator surface is generated by means of which the movable element is displaced, characterized in that electrical wave signals are simultaneously applied to at least two actuators facing each other, so that oppositely directed waves are generated in the surface of the stator, the two oppositely directed waves forming a compound wave in the surface of the stator by means of which the movable element is displaced over a moving area located between the actuators, characterized in that a measuring system determines the position of the movable element, subsequently the measured position is compared with a desired position by means of a processor after which, based on a difference between the measured position and the desired position, at least one electrical wave signal is applied to an actuator by the processor.

13. A wave motor comprising a movable element as well as a displacing device comprising at least two actuators facing each other on a stator, which actuators are connected to at least one generator, characterized in that the actuators facing each other on the stator can be activated simultaneously while a moving area over which the movable element can be displaced is located between the actuators that can be activated simultaneously.

14. A wave motor comprising a movable element as well as a displacing device comprising at least two actuators facing each other on a stator, which actuators are connected to at least one generator, characterized in that the actuators facing each other on the stator can be activated simultaneously while a moving area over which the movable element can be displaced is located between the actuators that can be activated simultaneously, characterized in that the wave motor further includes a processor connected to the generator, as well as a measuring system connected to the processor.

15. A wave motor as claimed in claim 13, characterized in that at least two pairs of actuators facing each other are positioned on the stator, the pairs mutually enclosing a 90° angle.

16. A displacing device suitable for application in a wave motor, the displacing device comprising at least two actuators facing each other and positioned on a stator, the actuators being connected to at least one generator, characterized in that the actuators facing each other on the stator can be activated simultaneously, a moving area being located between the actuators that can be activated simultaneously.

17. A wave motor comprising a movable element as well as a displacing device comprising at least two actuators facing each other on a stator, which actuators are connected to at least one generator, characterized in that the actuators facing each other on the stator can be activated simultaneously while a moving area over which the movable element can be displaced is located between the actuators that can be activated simultaneously, characterized in that the assembly comprises at least two wave motors whose movable elements are rigidly connected to each other.

18. Apparatus for moving an object comprising:

at least one stator suitable for supporting the object;

at least one first actuator means for providing a first surface wave motion of the stator;

at least one second actuator means for providing a second surface wave motion of the stator;

at least one measuring system for measuring position of the object;

at least one controller means for simultaneously controlling the first and second actuator means, responsive to the position, so that a sum of the first and second surface wave motions creates a specific desired effect on the position of the object.

19. The apparatus of claim 18, further comprising at least one further actuator means for providing at least one third surface wave motion of the stator, wherein the control means is adapted to provide simultaneous control of all the actuator means so that a sum of all the surface wave motions provided by the actuator means creates the specific desired effect.

20. An assembly comprising a plurality of apparatuses according to claim 18;

a plurality of mechanical coupling devices for coupling the apparatuses at a connection point;

wherein the control means of the apparatuses are adapted to operate cooperatively to provide a desired motion of the connection point.

* * * * *